United States Patent Office 3,816,536
Patented June 11, 1974

3,816,536
2-2-DISUBSTITUTED CYCLOALKANE-1,3-DIONES
Ulrich Eder and Gerhard Sauer, Berlin, Germany, assignor to Schering AG, Berlin & Bergkamen, Germany
No Drawing. Filed Apr. 2, 1971, Ser. No. 113,223
Claims priority, application Germany, Apr. 4, 1970,
P 20 16 750.4
Int. Cl. C07c 45/00
U.S. Cl. 260—586 R
8 Claims

ABSTRACT OF THE DISCLOSURE 2,2-Disubstituted cycloalkane-1,3-diones having the formula:

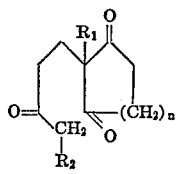
(I)

wherein $n$ is 1 or 2, $R_1$ is lower alkyl, and $R_2$ is hydrogen or an organic group prepared by reacting a cycloalkane-1,3-dione having the formula:

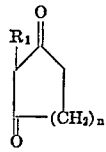
(II)

wherein $n$ and $R_1$ have the same meaning as above in a solvent or mixture of solvents in the absence of any catalyst with a vinylketone having the formula:

$$R_2CH_2COCH=CH_2 \quad \text{(III)}$$

wherein $R_2$ has the same meaning as above.

---

This invention relates to 2,2-disubstituted cycloalkane-1,3-diones and a method of preparing the same.

More specifically the 2,2-disubstituted cycloalkane-1,3-diones constituting the subject matter of the invention correspond to the following formula:

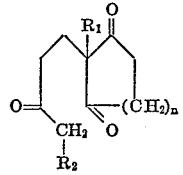
(I)

wherein $n$ is 1 or 2, $R_1$ is lower alkyl, and $R_2$ is hydrogen or an organic group.

In accordance with the invention, these compounds are prepared by reacting a cycloalkane-1,3-dione having the formula:

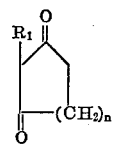
(II)

wherein $n$ and $R_1$ have the same meaning as above in a solvent or mixture of solvents in the absence of any catalyst with a vinylketone having the formula:

$$R_2CH_2COCH=CH_2 \quad \text{(III)}$$

wherein $R_2$ has the same meaning as above.

Instances of suitable alkyl groups $R_1$ include alkyl groups having 1 to 6 carbon atoms. These alkyl groups may be straight or branched. Preferable examples of substitutents $R_1$ are methyl, ethyl, n-propyl and n-butyl.

In accordance with the invention, no question arises as to which organic groups may be present as the substitutent $R_2$ in the vinyl ketone corresponding to Formula III and which is used as a starting material in the preparation of the compounds of the invention. This substitutent can be for instance any saturated or unsaturated open chain or cyclic hydrocarbon group, the carbon chain of which may also be interrupted by heteroatoms. The hydrocarbon group can also be substituted as for instance by halogen or by free or functionally modified hydroxy, amino, carbonyl and carboxyl groups.

Preferably, the substitutent $R_2$ designates organic groups containing from 1 to 15 carbon atoms.

Particularly valuable products are obtained when the starting material used is a vinyl ketone of Formula III in which the substituent $R_2$ is the group $$-(CH_2)_m-R_3$$

wherein $m$ is a whole number of from 0 to 2 and $R_3$ is hydrogen, a free or esterified carboxyl group, a free, etherified or esterified α-hydroxy alkyl group containing 2 to 4 carbon atoms, a halogen alkenyl group containing 2 to 5 carbon atoms, a ketalized oxoalkyl group containing 2 to 4 carbon atoms or an unsubstituted phenyl or substituted phenyl group wherein the substituent is halogen, alkyl, amino, alkylamino, acylamino, hydroxy, alkoxy, or acyloxy.

The addition of the vinyl ketone to 2-alkyl-cycloalkane-1,3-dione in the presence of a basic catalyst to form 2,2-disubstituted cycloalkane-1,3-diones of Formula I is known (C. B. C. Boyce and J. S. Whitehurst: J. Chem. Soc., (1959), 2022; J. N. Gardner, B. A. Anderson and E. P. Oliveto: J. Org. Chem., 34, (1969), 107; S. Ramachandran and M. S. Newmann: Org. Synth. 41, (1961), 38).

The known process has the disadvantage that the reaction does not stop at the formation of the desired 2,2-disubstituted cycloalkane-1,3-diones but under the influence of the basic catalyst, the compounds continue to react with the formation of the following products as hereinafter designated IV to VI

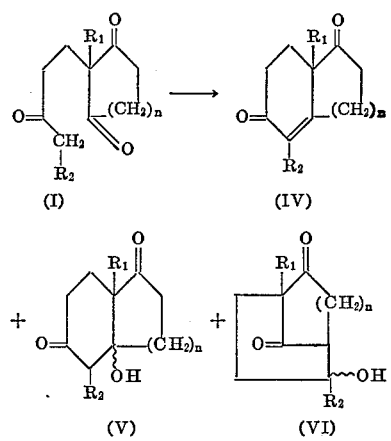

Thus, for example, there are not formed the 2,2-disubstituted-cycloalkane-1,3-diones of Formula I which Boyce and Whitehurst through addition of methylvinyl ketone to 2-methylcyclo-pentane-1,3-dione in the presence of potassium lye had expected but instead condensation products of Formula VI as was clearly and unequivocally established through NMR spectroscopic investigation of the reaction products.

The basic catalyzed conversion of vinyl ketone with cycloalkane-1,3-diones because of the aforesaid secondary reaction has not proved acceptable and accordingly, 2,2-disubstituted cycloalkane-1,3-diones of the Formula I have not been manufactured on a technical scale.

It has now most surprisingly been found that the 2,2-disubstituted cycloalkane-1,3-diones of Formula I can be prepared in substantially quantitative yield and the mentioned side reaction avoided by reacting the vinyl ketone of Formula III in the absence of any catalyst and in the presence of a solvent or mixture of solvents.

As solvent, water has proved particularly suitable. Likewise, but at the expense of reduced reaction velocities, the reaction can be carried out in organic solvents as for instance in lower alcohols such as methanol or ethanol, in cyclic ethers such as tetrahydrofuran or dioxan, or in aromatic hydrocarbons such as benzene or toluene. It is of course understood that there can also be used mixtures of organic solvents or mixtures of organic solvents with water. Furthermore, it is not necessary that the reaction take place in a homogeneous solution, but that the reaction can very satisfactorily be carried out with the reaction components suspended or emulsified in the solvent or solvent mixture.

The conversion preferably takes place at a reaction temperature of between 20 and 80° C. The reaction time depends on the reaction temperature and solvent selected and amounts to between 1 and 30 hours.

The working up of the reaction mixture is carried out in the known manner, for instance, after extraction of the aqueous reaction mixture with an organic solvent such as methylene chloride, chloroform, ether, benzene or methylisobutylketone, the organic solvent is driven off in vacuum and the distillation residue purified through fractional distillation or crystallization.

The smooth reaction course of the process of the invention is to be considered most surprising. The artisan knows that the addition of a vinyl ketone to 1,3-diketone takes place in that the methylene group and the 1,3-diketone in the presence of the base forms a carbanion and that to this carbanion there is then added the positive polarized terminal methylene group of the vinyl ketone. It could not have been expected that the alkyl vinyl ketone in the absence of the basic catalyst would add onto the 2-alkylcycloalkane-1,3-dione.

The 2,2-disubstituted cycloalkane-1,3-diones prepared by the process of the invention are valuable intermediate products for use in the manufacture of pharmacologically active susbtances. In particular, the compounds of the process of the invention are suitable as starting materials for the total synthesis of steroid hormones of the andro-stane- and pregnane series and also of 19-nor-steriods (L. Velluz, J. Vails & G. Nomine; Angew. Chem., 77 (1965), 185).

The following examples are given in order to more fully illustrate the invention and are not to be construed as a limitation of the scope thereof.

EXAMPLE 1

300 ml. water were poured onto 30 g. 2-methylcyclopentane-1,3-dione and after the addition of 25 ml. methylvinylketone, the resulting mixture was heated at 50° C. for 2 to 3 hours with stirring. The reaction mixture was then cooled, saturated with sodium chloride and extracted repeatedly with chloroform. The combined chloroform phases were dried over sodium sulfate and fractionated by distillation. There were recovered 45.2 g. 2-methyl-2-(3'-oxobutyl)-cyclopentane-1,3-dione as a bright yellow oil having a boiling point of 90–93° C. at 0.1 torr. IR-Spectrum: carbonyl bands at $5.75\mu$ (ring ketone) and $5.83\mu$ (side chain ketone).

EXAMPLE 2

5 g. 2-Ethyl-cyclopentane-1,3-dione and 5 ml. methylvinylketone in 50 m. ethanol were heated together for 5 hours at 60° C.

After the reaction had been completed, the reaction mixture was fractionated by distillation. There were obtained 7.2 g. 2 - ethyl-2-(3'-oxobutyl)-cyclopentane-1,3-dione as a colorless oil having a boiling point of 98–100° C. at 0.15 torr. IR-Spectrum: carbonyl bands at $5.76\mu$ and $5.83\mu$.

EXAMPLE 3

5 g. 2-Methyl-cyclohexane-1,3-dione and 5 ml. methylvinylketone in 100 ml. dioxan were heated for 10 hours under reflux.

After working up the reaction mixture by fractional distillation, there were recovered 7.5 g. 2-methyl-(3'-oxobutyl)-cyclohexane-1,3-dione as a light yellow oil having a boiling point of 110° C. at 0.1 torr. IR-Spectrum: carbonyl bands at $5.78\mu$ and $5.88\mu$.

EXAMPLE 4

5 g. 2-Ethylcyclohexane-1,3-dione and 5 ml. methylvinylketone in 100 ml. water were heated for 2 hours at 70° C.

The reaction mixture was worked up as in Example 1 and there were obtained 7 g. 2-ethyl-2-(3'-oxobutyl)-cyclohexane-1,3-dione as a weak yellow oil having a boiling point of 115° C. at 0.1 torr. IR-Spectrum: carbonyl bands at $5.78\mu$ and $5.88\mu$.

EXAMPLE 5

5 g. 2-Butyl-cyclohexane-1,3-dione and 5 ml. methylvinylketone in a mixture of 20 ml. methanol and 40 ml. water were heated for 5 hours at 70° C. under stirring.

The reaction mixture was worked up as in Example 1 and there were recovered 7.3 g. 2-butyl-2-(3'-oxobutyl)-cyclohexane-1,3-dione as an oil having a boiling point of 115° C. at 0.1 torr. IR-Spectrum: carbonyl bands at $5.78\mu$ and $5.88\mu$.

EXAMPLE 6

5 g. 2-Methyl-cyclopentane-1,3-dione and 10 g. 5-oxo-$\Delta^6$-heptene-acid methyl ester in 50 ml. water were heated for 3 hours at 70° C.

The reaction mixture was worked up as in Example 1 and there were recovered 9.8 g. 5-oxo-7-(1'-methyl-cyclopentane-2',5',-dione-1'-yl)-heptane acid methylester as an almost colorless oil having a boiling point of 141–145° C. at 0.01 torr. IR-Spectrum: carbonyl bands at $5.72\mu$ (ester bands) at $5.75\mu$ (ring ketone) and a shoulder at $5.82\mu$ (side chain ketone).

EXAMPLE 7

5 g. 2-Ethylcyclopentane-1,3-dione and 10 g. 5-oxo-$\Delta^6$-heptene acid methylester in 50 ml. methanol were heated for 6 hours under reflux.

After the reaction mixture had been worked up through fractional distillation, there were obtained 8.9 5-oxo-7-(1'-ethyl-cyclopentane - 2',5' - dione-1'-yl)-heptane acid methyl ester as a yellowish oil having a boiling point of 144–148° C. at 0.01 torr. IR-Spectrum: ester bands at $5.72\mu$ and carbonyl bands at $5.75\mu$ with a shoulder at $5.82\mu$.

EXAMPLE 8

10 g. 2-methyl-cyclopentane-1,3-dione were suspended in 100 ml. water and following the addition of 10 ml. ethylvinylketone heated for 4 hours at 65° C.

The reaction mixture was then allowed to cool, extracted with chloroform, the organic phase washed with water and fractionally distilled.

There were recovered 16.1 g. 2-methyl-2-(3'-oxobutyl)-cyclopentane-1,3-dione as a colorless oil having a boiling point of 103–105° C. at 0.2 Torr. IR-Spectrum: carbonyl bands at $5.77\mu$ with a shoulder at $5.82\mu$.

EXAMPLE 9

6.0 g. 6-(m-methoxyphenyl)-hex-1-ene-3-one and 3.5 g. 2-methyl-cyclopentane-1,3-dione in 15 cc. water/ethanol (1:1) were heated for 15 hours at 70° C. under stirring.

After completion of the reaction, the reaction mixture was diluted with 10 cc. water and extracted repeatedly with methylene chloride. The combined organic phases were washed with saturated sodium chloride solution, dried and the solvent evaporated off in vacuum. The remaining oily residue was chromatographed on silica gel (Merck). There were recovered 6.6 g. 2-methyl-2-[3'-oxo-6'(m-methoxy -phenyl) - hexyl] - cyclopentane-1,3-dione as a colorless oil.

EXAMPLE 10

(a) 171 g. 5-keto-hexane acid ethylester were dissolved in 1 l. toluene, reacted with 132 g. pyrocatechol and 2.5 g. p-toluenesulfonic acid and heated for 20 hours in a water separator. Following cooling, the reaction mixture was extracted three times each time with 1 l. 1 N aqueous soda lye, the organic phase dried over sodium sulfate, filtered and concentrated to dryness in vacuum. The residue was distilled in high vacuum and there were recovered 210 g. 5.5-(o-phenylenedioxy)-hexane acid ethylester.

(b) 161 g. 5.5-(o-phenylene-dioxy)-hexane acid ethylester were dissolved in 1 l. absolute tetrahydrofuran and the solution added dropwise to a suspension of 20 g. lithium aluminum hydride in 500 ml. absolute tetrahydrofuran so that the reaction solution boiled under reflux. The reaction mixture was then heated for a further hour without reflux, cooled to −10° C. and reacted in succession with 20 ml. water, 20 ml. 15% soda lye, and 60 ml. water. The precipitate which formed was separated off, the remaining solution concentrated in vacuum and the recovered product distilled in high vacuum. There were recovered 142 g. 5.5-(o-phenyldioxy)-hexane-1-ol having a boiling point of 95° C. at 0.06 Torr.

(c) 375 g. chromic acid-pyridine complex (Collins reagent) were dissolved in 3.7 l. absolute methylenechloride, the resulting solution cooled to 0° C. and reacted within a 15-minute period with a solution of 75 g. 5,5-(o-phenyldioxy)-hexane-1-ol in 700 ml. methylenechloride. The reaction mixture was then allowed to stand for 20 minutes at 0° C., filtered over a column of 200 g. neutral aluminum oxide, concentrated in vacuum and the recovered crude product chromatographed over a silica gel column. There were recovered 51 g. 5,5-(o-phenylenedioxy)-hexanal.

(d) A Grignard solution (prepared from 60 g. magnesium, 1.2 l. tetrahydrofuran and vinylchloride) was within an hour added in dropwise fashion to a solution cooled to −10° C. of 80 g. 5,5-(o-phenylenedioxy)-hexanal in 800 ml., under stirring. The reaction mixture was stirred for another hour at −10° C., decomposed by the addition of saturated, aqueous ammonium chloride solution, the resulting mixture extensively concentrated in vacuum, reacted with water and extracted with chloroform. The chloroform phase was concentrated in vacuum. 96 g. crude product were recovered.

The crude product was dissolved in 900 ml. acetone and cooled to −20° C. There were then introduced into this solution, under stirring and within a 20-minute period, 120 ml. Jones reagent (8 N solution of chromic acid in 20% aqueous sulfuric acid), the resulting mixture stirred for a further 30 minutes at −20° C., the reaction mixture diluted with water and extracted with chloroform. The chloroform phase was evaporated and the residue chromatographed over a silica gel column. There were recovered 86 g. 7,7-(o-phenylenedioxy)-1-octene-3-one as a colorless oil.

(e) 85 g. 7,7-(o-phenylenedioxy)-1-octene-3-one were reacted with 300 ml. dioxan, 300 ml. water and 50 g. cyclopentane-1,3-dione and heated for 7 hours under reflux.

Following cooling, the reaction mixture was poured into 300 ml. water, extracted with chloroform, the chloroform phase dried with sodium sulfate and evaporated in vacuum to dryness. The recovered crude product was chromatographed over a silica gel column and there were recovered 116 g. 2-methyl-2-[3'-oxo-7',7'-(o-phenylenedioxy)-octyl]-cyclopentane-1,3-dione as a colorless oil.

(f) The 2-methyl-2-[3'-oxo-7',7'-(o-phenylenedioxy)-octyl]-cyclopentane-1,3-dione can be converted to the (−)-17β-hydroxy-des-A-9(10)-estren-5-one by the following method:

2-methyl-[3'-oxo - 7',7' - (o - phenylenedioxy)-octyl]-cyclopentane-1,3-dione were refluxed with L-phenylalanine, acetonitrile and 1 N perchloric acid for 45 hours. The reaction mixture was further worked up and the 7,7a - dihydro - 7a - methyl-4-[3',3'-(o-phenylenedioxy)-butyl]1,5(6H)-indane dione is recovered.

(+)-7,7a-dihydro-7a-methyl-4-[3',3' - (o - phenylenedioxy)-butyl]-1,5(6H)-indane dione dissolved in isopropanol is cooled to −10° C., treated with sodium borohydride and, after reaction, the 7,7a-dihydro-1-hydroxy-7a-methyl-4-[3',3'-(o-phenylenedioxy) - butyl] - 5(6H)-indanone is recovered. This compound is dissolved in ethanol containing 1 N hydrochloric acid and hydrogenated at a atmospheric pressure in the presence of a palladium charcoal catalyst to the 3a,4,7,7a-tetrahydro-1-hydroxy-7a-methyl-4-[3',3'-(o-phenylenedioxy) - butyl]-5(6H)-indanone. The latter is treated with 4 N hydrochloric acid in dioxane at 100° C. and after reaction the (−)-17β-hydroxy-des-A-9(10)-estren-4-one is recovered.

EXAMPLE 11

(a) 76 ml. Malonic acid diethylester and then 66 g. 1,3-dichloro-2-butene were introduced into a hot sodium ethylate solution (prepared from 12 g. sodium and 250 ml. absolute ethanol). The reaction mixture was heated for 30 minutes under reflux, the ethanol distilled off in vacuum, the residue poured into 2 N aqueous sulfuric acid, the aqueous phase extracted with chloroform, the chloroform phase washed with water and concentrated in vacuum. The recovered crude product was distilled in high vacuum and there were recovered 95 g. 4-chloro-3-pentene-1,1-dicarboxylic acid diethyl ester having a boiling point of 105–108° C. at 1.5 torr.

(b) 92 g. 4-Chloro-3-pentene-1,1-dicarboxylic - acid diethylester were introduced into a solution of 70 g. potassium hydroxide in 200 ml. ethanol and 100 ml. water and the mixture heated for 5 hours at boiling under stirring. The reaction mixture was extensively evaporated under vacuum, the residue reacted with icewater, acidified with hydrochloric acid to a pH of 1.0 and the resulting reaction mixture extracted with ether. The ether phase was evaporated in vacuum, the residue heated for 90 minutes at 160–170° C. and then distilled in vacuum. There were recovered 23.5 g. 5-chloro-4-hexene acid having a boiling point of 133–135° C. at 14 torr.

(c) 8.3 g. 5-Chloro-4-hexene acid were dissolved in 50 ml. tetrahydrofuran and this solution introduced within 20 minutes, under stirring, into a suspension of 1 g. lithium aluminum hydride in 25 ml. absolute tetrahydrofuran. Thereafter, the reaction mixture was heated for 1 hour under reflux, cooled to 0° C. and reacted with 1 ml. water, 1 ml. 15% soda lye and 3 ml. water, filtered and the recovered solution evaporated in vacuum. There were recovered 5.3 g. 5-chloro-4-hexene-1-ol as a colorless oil.

(d) 3.8 g. 5-Chloro-4-hexene-1-ol were dissolved in 35 ml. absolute methylene chloride and the recovered solution introduced in dropwise fashion into a solution cooled to 0° C. of 20 g. chromic acid-pyridine complex (Collins Reagent) in 200 ml. methylenechloride. The reaction mixture was allowed to stand for a further 20 minutes, filtered through an aluminum oxide column and the recovered solution evaporated in vacuum. The recovered crude product was chromatographed on a silica gel column and yielded 2.6 g. 5-chloro-4-hexenal as a colorless oil.

(e) A solution of 2 g. 5-chloro-4-hexenal in 10 ml. tetrahydrofuran were added dropwise within 5 minutes to a vinyl magnesiumchloride solution cooled to −10° C.

and prepared from 1 g. magnesium, 20 ml. absolute tetrahydrofuran and vinylchloride. The reaction mixture was allowed to stand for 1 hour at 0° C., decomposed by the addition of 10 ml. saturated, aqueous ammonium chloride solution, poured into ice water, the aqueous phase extracted with chloroform and the chloroform phase evaporated in vacuum. The recovered crude product was dissolved in 30 ml. acetone, cooled to −20° C. and reacted with 2.1 ml. chromic acid solution (8 N chromic acid in 20% sulfuric acid). The reaction mixture was allowed to stand another 30 minutes at −20° C., poured into icewater, the aqueous phase extracted with chloroform was evaporated in vacuum. The recovered crude product was chromatographed over a silica gel column and there were recovered 1.6 g. 7-chloro-1,6-octadiene-3-one as a colorless oil.

(f) 17 g. 7-Chloro-1,6-octadiene-3 - one were reacted with 75 ml. dioxan, 75 ml. water and 13.5 g. 2-methyl-cyclopentane-1,3-dione and heated for 7 hours under reflux.

After working up the reaction mixture as described in Example 10, there were recovered 24.8 g. 2-methyl-2-(3'-oxo-7'-chloro-6'-octenyl)-cyclopentane - 1,3 - dione as a colorless oil.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A process for preparing 2,2 - disubstituted cycloalkane-1,3-diones of the formula

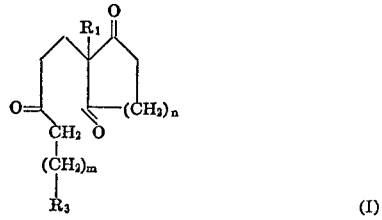

(I)

wherein $n$ is 1 or 2, $m$ is zero, 1 or 2, $R_1$ is lower alkyl of 1 to 6 carbon atoms, and $R_3$ is hydrogen, free or lower alcohol esterified carboxyl, chloroalkenyl of 2–5 carbon atoms, orthodiphenol ketalized oxoalkyl of 2–4 carbon atoms, phenyl or methoxy phenyl which comprises the step of reacting a 2-alkyl-cycloalkane-1,3-dione of the formula

(II)

wherein $n$ and $R_1$ are as above defined with a vinylketone of the formula

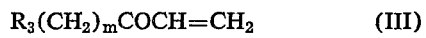

(III)

wherein $m$ and $R_3$ are as above defined, in a solvent or mixture of solvents and in the absence of a catalyst.

2. Process according to claim 1 wherein said solvent is water.

3. Process according to claim 1 wherein said solvent is a lower alcohol.

4. Process according to claim 3 wherein said solvent is methanol or ethanol.

5. Process according to claim 1 wherein said solvent is dioxan or tetrahydrofuran.

6. Process according to claim 1 wherein said solvent is a mixture of water with a lower alcohol or cyclic ether.

7. Process according to claim 1 wherein said reaction is carried out at a temperature of from 20–80° C.

8. The process of claim 1 wherein 2-methyl-cyclopentane-1,3-dione is reacted with methylvinylketone in the presence of water as solvent at a temperature between 20 and 80° C. and a reaction time of 1 to 30 hours followed by solvent-extraction of the reaction product, evaporation of the solvent and purification of the residue by distillation whereby 2-methyl-2-(3' - oxobutyl)-cyclopentane-1,3-dione is obtained.

References Cited

UNITED STATES PATENTS 3,506,693     4/1970     Bucourt et al. _____ 260—340.9

DONALD G. DAUS, Primary Examiner

J. H. TURNIPSEED, Assistant Examiner

U.S. Cl. X.R.

260—340.5, 340.7, 340.9, 468 R, 488 R, 539 R, 514 R, 586 H, 591

Notice of Adverse Decision in Interference

In Interference No. 98,992, involving Patent No. 3,816,536, U. Eder and G. Sauer, 2-2-DISUBSTITUTED CYCLOALKANE-1,3-DIONES, final judgment adverse to the patentees was rendered Aug. 12, 1975, as to claims 1, 2 and 8.

[*Official Gazette January 13, 1976.*]